Nov. 5, 1963 W. LASAR 3,109,472
MEAT GRINDER GUARD MEANS
Filed June 1, 1961 2 Sheets-Sheet 1
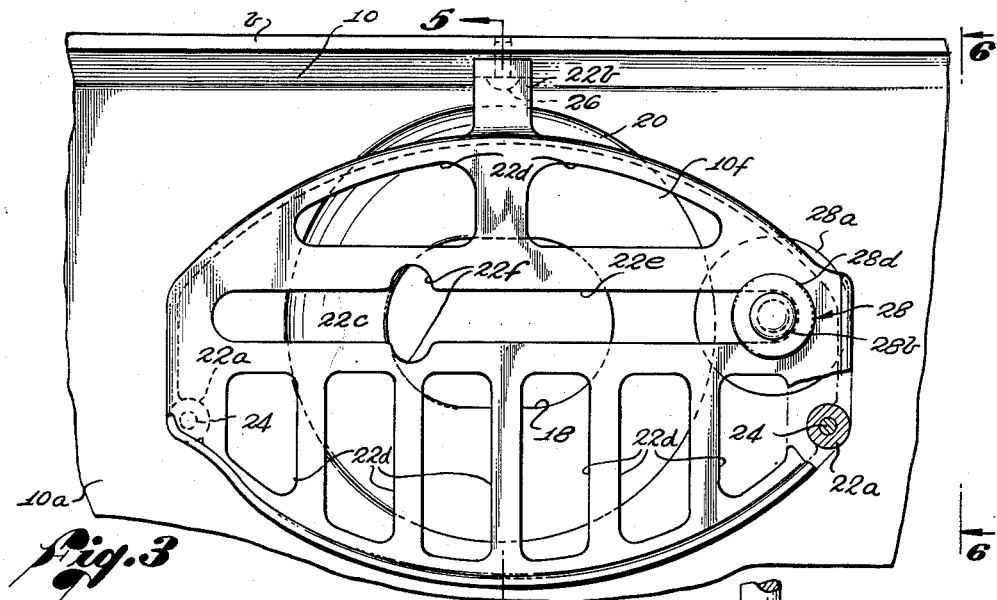
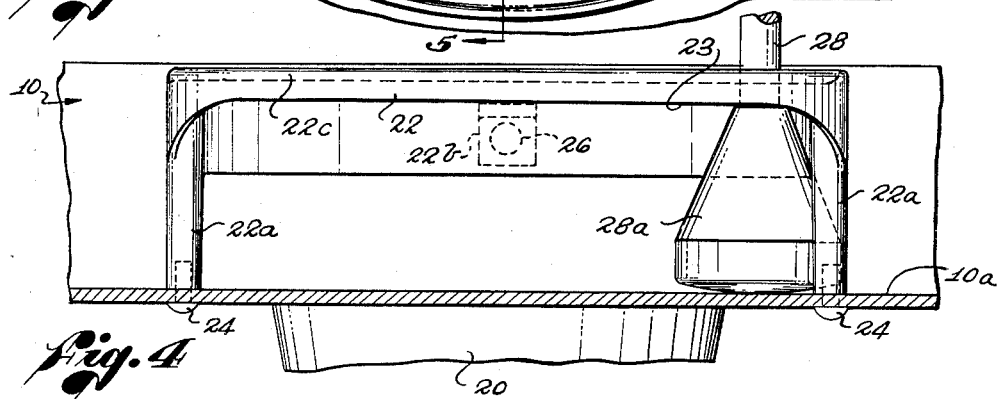
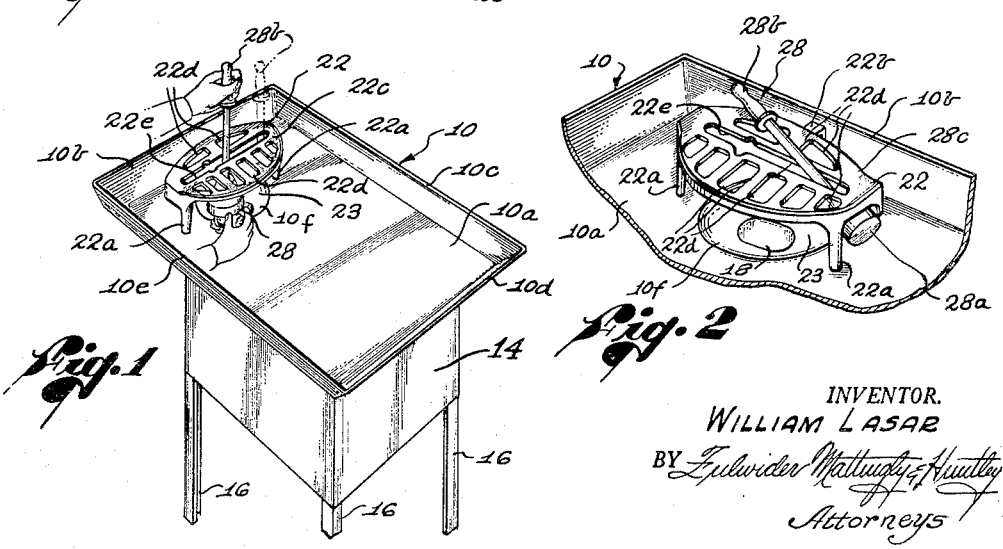
INVENTOR.
WILLIAM LASAR
BY Fulwider Mattingly & Huntley
Attorneys Nov. 5, 1963 W. LASAR 3,109,472
MEAT GRINDER GUARD MEANS
Filed June 1, 1961 2 Sheets-Sheet 2
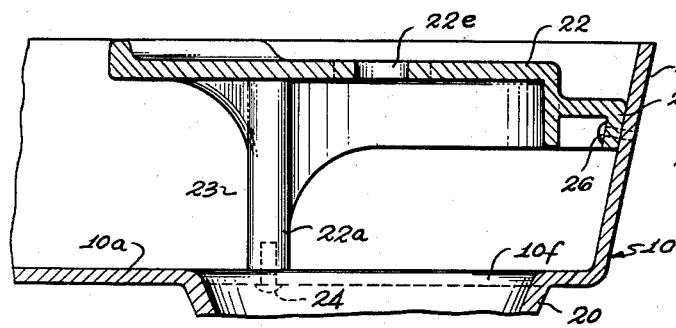
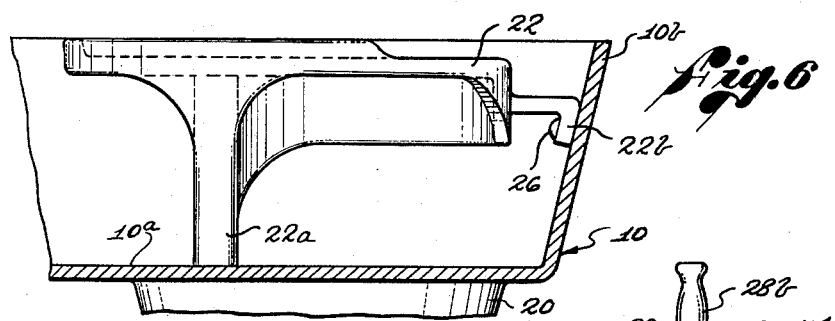
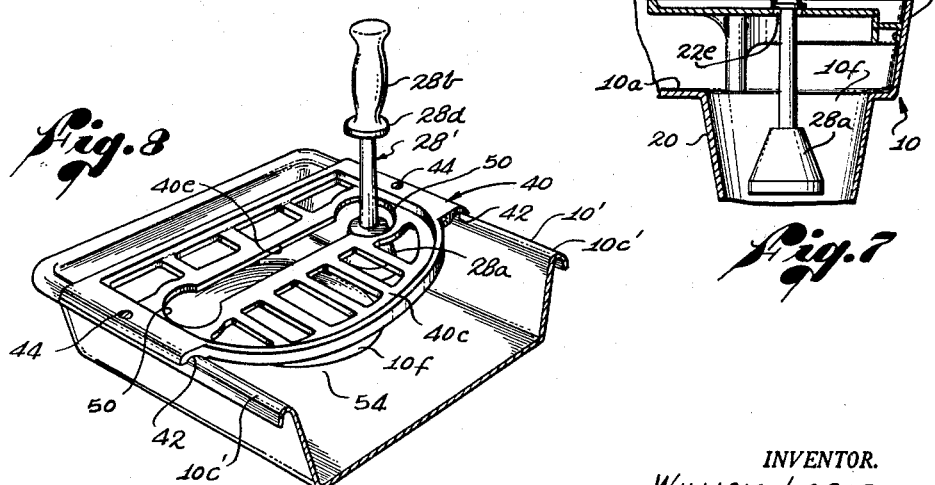
INVENTOR.
WILLIAM LASAR
BY Fulwider Mattingly & Huntley
Attorneys 3,109,472
MEAT GRINDER GUARD MEANS
William Lasar, 2540 E. 114th St., Los Angeles 2, Calif.
Filed June 1, 1961, Ser. No. 114,055
5 Claims. (Cl. 146—182)

This invention relates to meat grinding apparatus and guard means therefor, but more particularly to such apparatus which is safe to operate, easy to maintain in a sanitary condition, and highly efficient in operation.

One of the objectives in designing and manufacturing meat grinding apparatus is to provide sufficient safeguards such that the operator of the equipment will not be able to injure himself. Also, some of the parts or components of such equipment must be easy to disassemble to permit the equipment to be cleaned and maintained in a proper sanitary condition. These features are to be incorporated in the resulting apparatus at no cost whatever to the operating efficiency thereof.

Present day meat grinding apparatus usually employs a relatively large grinder having a grinding element in the form of a worm gear or the like which is rotated at a relatively high rate of speed. The meat inserted into the grinder is forced between the grinding element and the housing therefor and is also forced by such element through a grinding plate formed with suitably small openings.

As is understandable, such grinders are relatively large in size to enable the operator to grind a large quantity of meat during a short period of time. Because of this, however, many serious accidents have occurred, usually due to the fact that the operator inadvertently placed his hand or fingers too close to the grinding element. As a result, the various states of the United States have enacted into law regulations requiring the use of suitable guard means to prevent the operator from putting his hand or fingers near the grinding element.

Guard means heretofore used on meat grinding apparatuses have so restricted access to the inlet to the grinder that the efficiency of the operator and of the apparatus has been greatly impaired. Also, such guard means has been so constructed that it has provided many openings where the foodstuffs can become lodged, only to decay and ultimately contaminate the meat being fed to the grinder.

In view of the foregoing shortcomings of prior art devices, it is an object of the present invention to provide meat grinding apparatus which is more efficient than apparatus heretofore provided.

Another object of this invention is to provide safety guard means for meat grinding apparatus which effectively prevents an operator from injuring himself, and which does not detract from the overall efficiency of the meat grinding apparatus.

Another object is to provide such apparatus which can be partially disassembled to permit the apparatus to be thoroughly cleaned.

Another object of this invention is to provide meat grinding apparatus as characterized above wherein is included a stomper head which corresponds in size to the throat or inlet opening of the grinding device.

Another object of this invention is to provide apparatus as characterized above which includes travel limiting means on said stomper to prevent engagement thereof with the grinding device.

Another object of this invention is to provide such apparatus which includes means whereby the stomper can be disassembled from the grinding apparatus to permit such stomper to be cleaned separately to insure the existence of sanitary conditions.

Another object of the present invention is to provide apparatus as characterized above wherein said stomper is formed as a single unitary structure whereby said travel limiting means will insure that no part of said stomper is able to contact the grinding apparatus.

Another object of this invention is to provide meat grinding apparatus as above described which is simple and inexpensive to manufacture, and rugged and dependable in operation.

The novel features which I consider characteristic of my invention are set forth with particularity in the appended claims. The device itself, however, both as to its organization and mode of operation, together with additional objects and advantages thereof will best be understood from the following description of specific embodiments when read in connection with the accompanying drawings, in which:

FIGURE 1 is a perspective view of meat grinding apparatus according to the present invention;

FIGURE 2 is a fragmentary perspective view in enlarged scale of a portion of the work surface of the apparatus of FIGURE 1;

FIGURE 3 is a fragmentary top plan view in enlarged scale of the apparatus of FIGURE 1, showing the safety guard;

FIGURE 4 is a fragmentary sectional view in enlarged scale through the grinding table of the apparatus in FIGURE 1, the safety guard being shown in front elevation;

FIGURE 5 is a fragmentary sectional view taken substantially along line 5—5 of FIGURE 3;

FIGURE 6 is a fragmentary sectional view taken substantially along line 6—6 of FIGURE 3;

FIGURE 7 is a fragmentary sectional view corresponding to FIGURE 5 but showing a meat stomper in its operating position; and FIGURE 8 is a perspective view of a second form of meat grinding apparatus embodying the present invention.

Like reference numerals identify corresponding parts throughout the several views of the drawings.

Referring to FIGURE 1 of the drawings, there is shown therein a preferred embodiment of the present invention comprising a grinding table or work table 10 having a table top affording a work surface 10a provided with side walls 10b, 10c, 10d and 10e. The table top is positioned on a grinder housing 14, the latter of which is supported by suitable table legs 16.

Work surface 10a is formed with an opening 10f (FIGURE 3) through which passes the meat to be ground on its way to a suitable grinder (not shown) within housing 14. Opening 10f may take substantially any desired shape or form, but for purposes of efficiency and ease of operation of the apparatus, it should correspond in size and shape to the throat or inlet 18 to the grinder. A typical size opening for inlet 18 is approximately 5″ x 6″, and opening 10f in work surface 10a may be slightly larger as shown in the drawings. Means affording a chute or passageway 20 is provided between the opening 10f and the inlet 18 to the grinder to aid in directing the meat to the grinder. If opening 10f is larger than inlet 18, the chute 20 will have a tapered shape as shown in the drawings.

In order to insure safe operating conditions, as will hereinafter become more apparent, it is desirable that chute 20 be approximately 16 inches in length so as to position the grinding element a corresponding distance beneath work surface 10a.

The grinding device may employ a relatively large grinding element shaped like a worm gear for rotation so as to force chunks of meat through a grinding plate formed with openings of suitable size. Also, such chunks of meat will be partially ground before reaching the grinding plate due to the cooperation of the grinding element and the housing of the grinder. The particular form and construction of grinder employed in the grinding apparatus is not of significance to the present invention, it being realized that the present guard means and associated components can be employed with virtually any type of meat grinding equipment.

Mounted on the table top and fastened thereto and to the side wall 10b of the work surface 10a is a safety guard 22 over the opening 10f formed in the work surface. To facilitate mounting of safety guard 22, there is provided a pair of support legs 22a and a central mounting bracket 22b. Each of the support legs 22a is provided with a threaded opening for cooperation with a fastening bolt 24 which extends upwardly through a suitable opening in the table top. In this manner the legs 22a of guard 22 are firmly positioned on the work surface 10a. The bracket 22b is formed with a through opening for receiving a mounting screw or bolt 26 which is threadedly fastened to end wall 10b of the work surface.

Guard means 22 may be formed or fabricated in any desired manner, but I have found it most desirable to have it cast of aluminum or other material which will not oxidize or decompose readily. This latter feature, of course, is desirable to prevent contamination of the meat or other food to be processed by the apparatus.

Guard 22 is formed with a horizontal guard member or plate 22c having a series of openings 22d, no one of the latter of which is large enough to permit passage therethrough of a person's hand. Such openings 22d are provided to afford means whereby the operator working at the grinding table may view the chute 20 and the grinder disposed therebeneath throughout the food processing operation. However, in the interest of preventing injury to such operator or other persons near the apparatus, it is a necessary feature of the present invention that such openings 22d be of predetermined maximum size such that a person's hand cannot be passed therethrough. It has been determined that such openings should not have a dimension over 2½ inches in order to provide this safety feature.

Guard member 22c of safety guard 22 is further formed with an elongated opening or slot 22e which, as shown in FIGURE 3 of the drawings, is disposed immediately above the opening 10f in work surface 10a. As further shown in FIGURE 3, the openings 22d are arranged on opposite sides of slot 22e to facilitate operation of the apparatus as will be hereinafter explained in greater detail.

The support legs 22a of guard 22 should be of such length as to provide an opening 23 which is preferably between 4½ to 5 inches high. This opening 23 is defined by the underside of guard member 22c and work surface 10a and the support legs 22a. The chunks of meat which are to be ground are passed through this opening 23 for passage along chute 20 to the grinding device positioned therebeneath.

A stomper 28 shown in FIGURES 2 and 7 is operatively positioned within the elongated slot 22e formed in guard plate 22c when meat is to be ground. Stomper 28 is provided with a stomping head 28a at its lower end and an operating handle 28b at its upper end. It has been found desirable to have stomper 28 formed as a unitary structure such that the rod-like intermediate portion 28c, stomping head 28a and operating handle 28b are formed integrally. Mounted on intermediate portion 28c is a travel limiting element 28d in the form of an annular flange of such size as to normally be incapable of passing through slot 22e of safety guard 22. As shown most clearly in FIGURE 7 of the drawings, travel limiting element 28d limits the extent to which stomper 28 may be moved downwardly toward the grinder positioned beneath the chute 20. That is, in the interest of avoiding contamination of the food being processed by the apparatus, it is desirable to clearly prevent the stomper from engaging the grinding element of the grinder. If this safety feature is not employed, small chips from the stomping head could become mixed with the ground meat. Also, the grinding element could be damaged or at the least have its cutting edges dulled.

The normal operation of the above-described apparatus is as follows:

The meat to be ground is transported, either manually or by automatic equipment, to the work surface 10a. At this point the butcher reduces the large pieces of meat into smaller chunks which can be passed to the grinding device. Such feeding operation is accomplished manually as depicted with broken lines in FIGURE 1. That is, the operator slides the chunks of meat along the surface 10a of the work table, pushing such meat through the opening between the guard plate 22c of safety guard 22 and the work surface 10a. During this operation the stomper is retracted from the chute 20 and is positioned at one end of the slot 22e as indicated in dotted lines in FIGURES 1 and 3.

In order to hasten the grinding operation, it is generally desirable to push the chunks of meat down the chute 20 by means of the stomper 28. This is easily accomplished by the operator who can hold and control the stomper by means of operating handle 28b to cause the stomping head 28a to exert a downward force on the meat within chute 20. As above described in considerable detail, the stomping head 28a will not be permitted to reach the grinding element due to the travel limiting element 28d.

In order to thoroughly clean the grinding apparatus to prevent particles of food from being lodged in the equipment and eventually decaying and decontaminating the food, it is desirable to be able to remove stomper 28 from its position within safety guard 22. In this regard, it should be realized that the slot 22e of safety guard 22 is formed with a predetermined maximum width of about 2½ inches to positively prevent passage therethrough of a person's hand.

In order to permit removal of the stomper from guard 22, there is provided a pair of aligned cut-outs 22f on either side of slot 22c and in communication therewith. Such cut-outs 22f are not wide enough to accommodate a person's hand, but are of such size and shape as to permit passage therethrough of the travel limiting flange member 28d of stomper 28 when said stomper is disposed in a nearly horizontal position. That is, as most clearly shown in FIGURE 2 of the drawings, when the stomping head 28a is positioned on top of the work surface 10a, it can be passed through the opening or space between the safety guard 22 and such work surface provided the stomper is laid on its side. At this time, if the handle 28b of stomper 28 is pushed downwardly, the travel limiting flange 28d will pass through the opening afforded by slots 22e and the cut-outs 22f on either side thereof. It will be noted that operating handle 28b is of such width as to pass through the opening 22e.

The aforedescribed arrangement for removal of stomper 28 is particularly desirable because of the feature which requires the stomping head 28a to be completely removed from the chute leading to the grinder in order to effect such removal. Thus, in order to remove the stomper 28 it is necessary that the stomping head 28a be transferred to a position where it cannot engage the grinding element after such removal.

After the stomper and safety guard have been separately cleaned, it is a simple matter to reassemble the various components merely by reversing the aforedescribed procedure. That is, by inserting the handle 28b of the stomper between the guard plate 22a and work surface 10a, it may be passed upwardly through the slot 22e, the flange 28d passing through the opening afforded by cutouts 22f.

It will be noted that the safety guard 22 is so constructed that a person cannot extend his hand and arm through the opening between the guard plate 22a and work surface 10a so as to engage the grinding element. That is, due to placement of the safety guard 22 over the opening 10f, it is necessary that the pieces of meat to be ground pass horizontally along the work surface 10a and then downwardly through chute 20 in passing to the grinders. If a person's hand is extended in this direction, it will be found that the fingers and hand cannot be extended a sufficient distance down the chute 20 to engage the grinding element. Also, it is not possible for the person to place his entire arm down the chute 20 since it is impossible to position the arm in a near vertical position within the chute due to the position and size of safety guard 22 relative to the chute.

Referring now to FIG. 8, there is shown a second form of safety guard 40 constructed in accordance with the present invention. The safety guard 40 is generally similar to the aforedescribed safety guard 22 and may be utilized with a grinding table 10' similar to the grinding table 10 shown in FIGS. 1 through 7. The safety guard 40 does not utilize support legs, but instead is formed along its sides with a pair of grooves 42 that are received by the rounded upper edges of the side walls 10c' of the work table 10'. Suitable fastening means, such as bolts 44, extend from the edges of the safety guard 40 through the upper edges of the side walls 10c'.

The horizontal guard member 40c of the safety guard 40 is formed with a series of openings 40d similar to the openings 22d of the safety guard 22. Similarly the guard plate 40c is formed with an elongated opening or slot 40e similar to the opening or slot 22e of the hereinbefore described safety guard 22. It should be noted, however, that the slot 40e is not formed with cut-outs such as the cut-outs 22f of the aforedescribed safety guard 22. Instead, at each end of the slot 40e there is formed an annular enlargement 50 having diameter somewhat larger than the diameter of the stomping head 28a', it being contemplated that a stomper 28a' similar to the stomper used and described in conjunction wtih the safety guard 22 be employed.

In the use of the apparatus of FIG. 8, the stomper 28' will normally be positioned as shown in dotted lines in FIG. 8 as the chunks of meat to be ground are manually urged along the surface 10a' of the work table through the opening 54 defined by the top and sides of the table 10a and the underside of the guard plate 40c. When the stomper 28' is used to force the meat downwardly within the chute 20, the stomper is restrained against unlimited downward movement by the abutment of the travel limiting flange 28d with the sides of the slot 40e. To remove the stomper 28' for cleaning, the stomper is urged towards either end of the slot 40e. Thereafter, the stomper head 28a is vertically aligned with one of the enlargements 50 whereby the stomper may be lifted upwardly through such enlargement.

It is thus seen that the present invention provides grinding apparatus and guard means therefor which is extremely efficient since the grinder and all of the passageways leading thereto are sufficiently large to take chunks of meat which are relatively large in size. Also, certain of the components of such apparatus can be readily and easily disassembled to permit thorough and separate cleaning thereof to maintain the sanitary conditions desirable with apparatus of this type. As a further advantage, such apparatus includes guard means which clearly prevents a person from either inadvertently or intentionally placing a part of his body in the grinding device. It should be particularly noted that the stomper utilized in conjunction with both forms of the hereinbefore described apparatus is preferably formed of metal even though such stompers are conventionally formed of wood. A wooden stomper absorbs meat juices and the absorption thereof eventually causes the wood to become sour. Additionally, particles of a wooden stomper are liable to become free from the main body thereof and become mixed with the meat being ground.

Although I have shown and described certain specific embodiments of my invention, I am fully aware that many modifications thereof are possible. The invention itself therefore is not to be restricted except insofar as is necessitated by the prior art and by the spirit of the appended claims.

I claim:

1. Meat grinding apparatus comprising in combination, a work table having a work surface formed with an opening for receiving pieces of meat substantially larger than a person's hand, said work table also including side walls for said work surface, a meat grinder fixed to said table below said work surface having an inlet aligned with and of size corresponding to the opening in said surface, means affording a passageway from the opening in said work surface to the inlet of said grinder, a safety guard fixed to one of said side walls and said work surface over said opening in spaced relation to said work surface to provide an opening therebetween for the passage of meat to said grinder, said guard being formed with an elongated slot of predetermined maximum width to prevent passage therethrough of a person's hand, a meat stomper having a rod-like intermediate portion positioned within said slot and having a stomping head fixed to the lower end thereof and an operating handle at its upper end, said stomper further including an annular flange on said intermediate portion incapable of passing through said slot to thereby prevent said stomping head from contacting said grinder, and a cutout formed in said safety guard communicating with said slot for receiving said annular flange when but only when said stomper is disposed such that the stomping head thereof is between said guard and said work surface, whereby said stomper may be removed from said guard as desired.

2. Meat grinding apparatus comprising in combination, a work table having a work surface formed with an opening for receiving pieces of meat substantially larger than a person's hand, said work table also including side walls for said work surface, a meat grinder fixed to said table below said work surface having an inlet aligned with and of size corresponding to the opening in said surface, means affording a passageway from the opening in said work surface to the inlet of said grinder, a safety guard fixed to one of said side walls and said work surface over said opening in spaced relation to said work surface to provide an opening therebetween for the passage of meat in a direction substantially at right angles to the direction of said passageway, said guard being formed with an elongated slot of predetermined maximum width to prevent passage therethrough of a person's hand, a meat stomper having a rod-like intermediate portion positioned within said slot and having a stomping head fixed to the lower end thereof and an operating handle at its upper end, said stomper further including an annular flange on said intermediate portion incapable of passing through said slot to thereby prevent said stomping head from contacting said grinder, and a cut-out formed in said safety guard communicating with said slot for receiving said annular flange when but only when said stomper is disposed such that the stomping head thereof is between said guard and said work surface, whereby said stomper may be removed from said guard as desired.

3. Meat grinding apparatus comprising in combination, a relatively large grinder having an inlet capable of receiving pieces of meat substantially larger than a person's hand, means affording a work surface having an opening a predetermined distance from and substantially the same size as the inlet to said grinder, a safety guard over said opening in spaced relation to said work surface for passage therebetween of meat for said grinder, said safety guard being formed with at least one aperture of predetermined maximum size to prevent passage therethrough of a person's hand, said guard also being formed with a cutout communicating with said aperture, and a stomper positioned within the aperture in said guard having a stomping head on one side thereof of a size corresponding to the inlet of said grinder and an annular flange on the other side thereof of such size as to be normally incapable of passing through said aperture to thereby prevent said stomper from contacting said grinder, said stomper being separable from said guard when said stomping head is positioned between said work surface and said safety guard and said annular flange is passed through said cutout.

4. Meat grinding apparatus comprising in combination, a work table having a horizontal work surface formed with an opening for receiving pieces of meat substantially larger than a person's hand, said work table also including side walls for said work surface, a meat grinder fixed to said table below said work surface having an inlet aligned with and of size corresponding to the opening in said surface, means affording a passageway from the opening in said work surface to the inlet of said grinder, a horizontally extending safety guard fixed to one of said side walls and said work surface over said opening in spaced relation to said work surface to provide an opening therebetween for the passage of meat to said grinder, said guard being formed with an elongated slot of predetermined maximum width to prevent passage therethrough of a person's hand, said guard also being formed with an enlargement communicating with said slot at a point removed from said inlet, a meat stomper having a rod-like intermediate portion normally positioned within said slot and having a stomping head member fixed to the lower end thereof and an operating handle at its upper end, said stomper further including a flange member on said intermediate portion of greater dimensions than said slot that engages the upper surface of said guard to prevent said stomping head from contacting said grinder when said stomper is vertically aligned with said inlet, with said stomper being separable from said guard when said head member is disposed to one side of said inlet whereafter one of said members is removable vertically through said enlargement.

5. Apparatus as set forth in claim 4 wherein said enlargement is of greater dimensions than said stomper head.

References Cited in the file of this patent

UNITED STATES PATENTS

| 3,014,515 | Meeker et al. | Dec. 26, 1961 |

FOREIGN PATENTS

| 232,433 | Germany | Mar. 15, 1911 |
| 949,217 | Germany | Sept. 13, 1956 |